2 Sheets—Sheet 1.

G. VINCENT.
Car-Truck.

No. 212,770.      Patented Feb. 25, 1879.

Witnesses
Geo. H. Strong.
Frank A. Brooks

Inventor
George Vincent

2 Sheets—Sheet 2.
G. VINCENT.
Car-Truck.
No. 212,770. Patented Feb. 25, 1879.
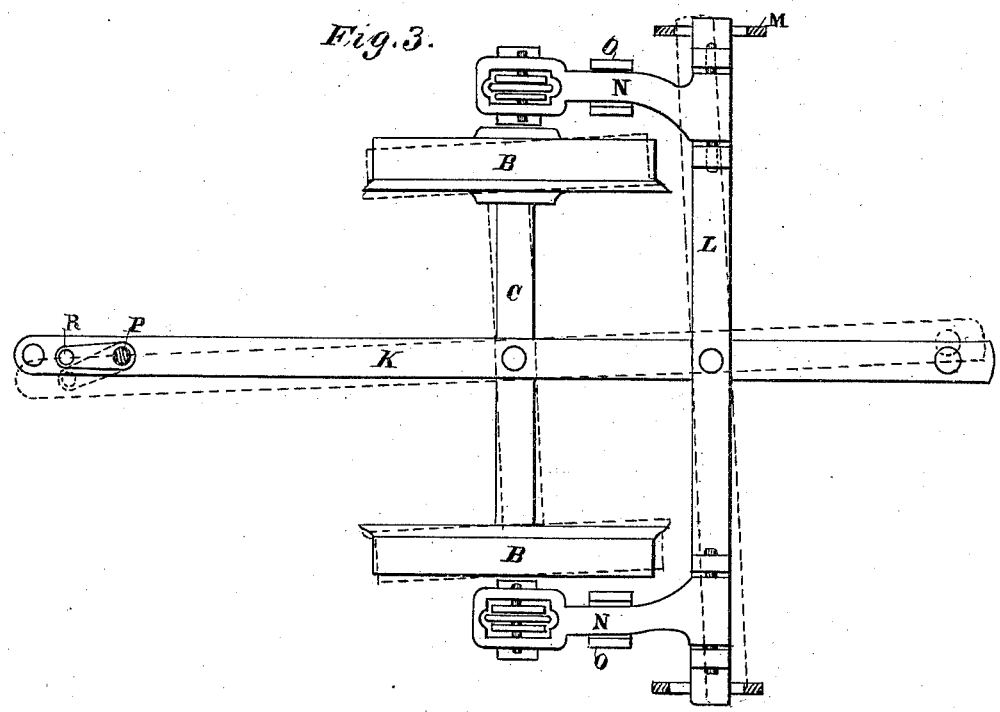
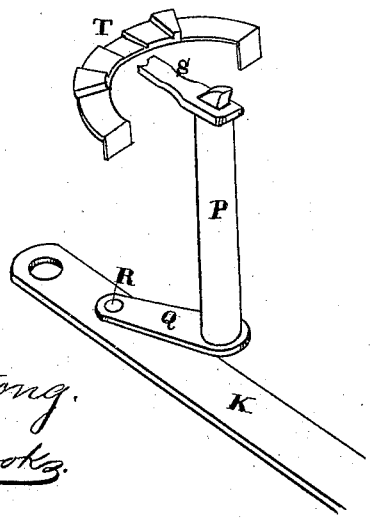
Witnesses
Geo. H. Strong.
Frank A. Brooks.
Inventor
George Vincent

UNITED STATES PATENT OFFICE.

GEORGE VINCENT, OF STOCKTON, CALIFORNIA.

IMPROVEMENT IN CAR-TRUCKS.

Specification forming part of Letters Patent No. 212,770, dated February 25, 1879; application filed August 19, 1878.

*To all whom it may concern:*

Be it known that I, GEORGE VINCENT, of Stockton, county of San Joaquin, and State of California, have invented an Improved Flexible Truck for Street-Railway Cars; and I do hereby declare the following to be a full, clear, and exact description thereof, reference being had to the accompanying drawings.

My invention relates to certain improvements in my patented system of flexible railway-trucks, by which I am enabled to apply it to that class of cars which are intended for use upon street-railways. By its use I am enabled to adjust the wheels with relation to each other so that the car will easily pass the sharp curves at the street-corners; and it may also be turned from one line of track to another without the use of the switch ordinarily employed.

It consists in mounting the car upon its four wheels by means of swinging boxes, similar to those described in a former application for Letters Patent made by me; and the upper part of these boxes are connected by a movable pivoted frame with jointed bars, extending longitudinally through beneath the car, so that the horses may be attached at either end of the bar and the mechanism be actuated by their movements, or by means of the shafts, extending up within reach of the driver, as will be more fully described by reference to the accompanying drawings, in which—

Figure 1:
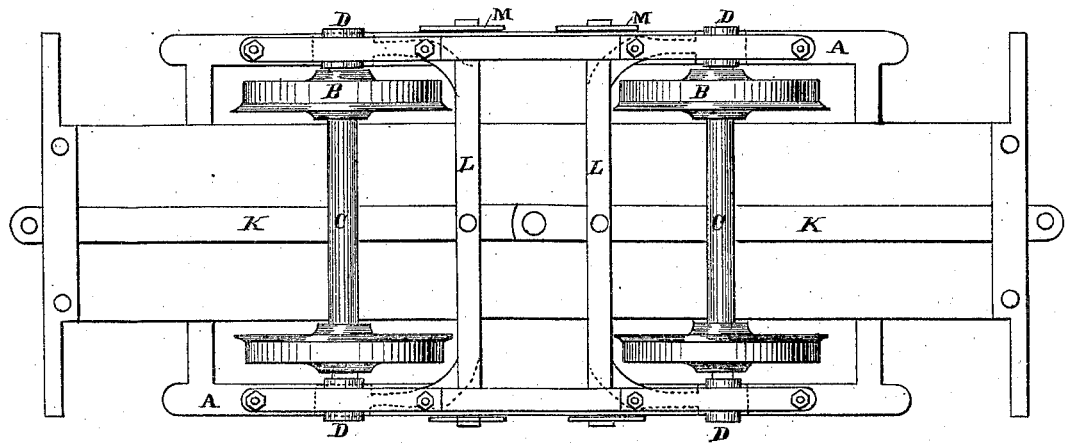
Figure 2:
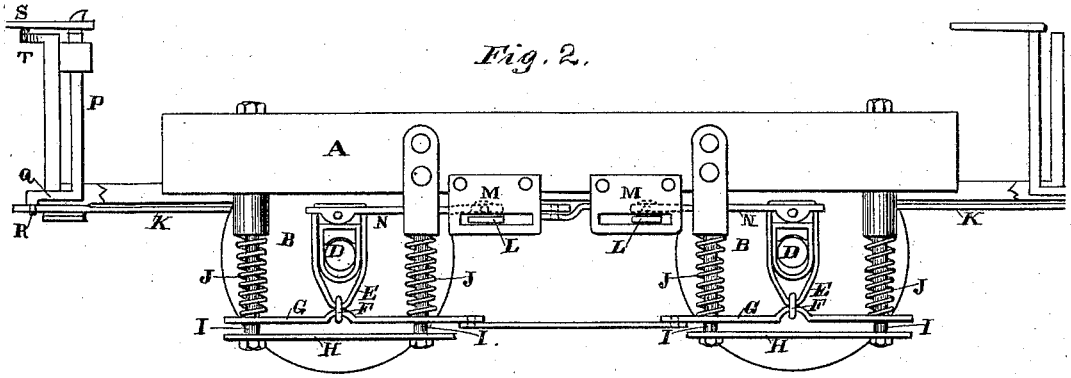

Figure 1 is a bottom view of my improved car and gear. Fig. 2 is a side elevation. Fig. 3 is a longitudinal section through one end. Fig. 4 is a detail view of parts of the machine.

A is the frame of the car, which represents an ordinary street-car, and is mounted upon four wheels, B. The ends of the axles C of these wheels turn in boxes D, and the car-frame is supported upon these boxes in the following manner: A link, E, is made to inclose the box, and its upper side lies in a groove made to receive it in the top of the box; thence it extends down upon each side of the box, and at the bottom it receives a link or shackle, F, which is fitted to it, and supports the bar G, lying in a groove in its lower side. The bars G extend along outside the wheels upon each side the car, and supplemental bars H, below them, opposite to each wheel, receive the pedestals I, which extend downward from the car-frame, through the bars G, and are secured in the bars H. Springs J surround the pedestals or posts I, and rest upon the bars G, so that they give the car-body an elastic support upon the wheels.

By means of the links E and F, supporting the car-frame from the boxes D in a manner similar to that shown in my former application for a patent, I am enabled to give the ends of the axles and the boxes a movement so that the axles may be made to stand as radii of the curve upon which the car may be moving. This movement of the axles is effected as follows: A stout bar, K, extends from one end to the other of the car, in the center, and this bar is jointed in the center, each section being pivoted to the car-frame just above the center of the axle at that end. A cross-bar, L, is secured to each of these sections, as shown, so as to extend across below the car and between the wheels. The ends of these bars are supported and steadied by guides M, and arms N project from these bars, so as to clasp the upper part of each box, to which they are pinned, as shown. These arms are formed on a curve which has the center of the axle and the point at which the bars K are pivoted as its center of motion, and they pass through guides at O, by which they are steadied in their movements. These arms are elastic, so as to allow the movement of the car-body upon its springs with relation to the wheels without deranging their action.

The operation will then be as follows: The horses are attached to the bars K at one end or the other, depending upon the direction in which the car is moving, and when the car reaches a curve the movement of the horses in turning will turn the bars K, and thus, through their connecting-arms, the axles will be set at an angle toward each other, or as radii of the curve upon which the car is moving. In order to allow the driver to move this mechanism, a vertical shaft, P, is placed at each end, and a crank-arm, Q, at the bottom has a pin, R, which enters the bar K, so as to move the bar from side to side when the shaft is turned. The upper end of the shaft has a peculiar head, with an incline, upon which the operating-handle S may be placed and locked by the shape of the head. A rack, T, serves to hold this handle in any required position; and it will be seen that by turning this handle the wheels may be inclined so as to enter upon another line of track without the use of a switch.

By this mechanism I am enabled to fit the wheels to the curve, so that they will tend to follow it, and in the present construction of the curves, with an outer flat rail, upon which the wheel-flange rides, my device is rendered even more effective. The wheels will track perfectly, and I am enabled to separate the two pairs of wheels much farther and obtain a broader wheel-base than with rigidly-placed axles. This makes a much steadier-riding car than with the old style. The guides O, in which the arms N are steadied, serve to relieve the parts from all end thrust and strain consequent thereon.

Having thus described my invention, what I claim as new, and desire to secure by Letters Patent, is—

1. The axle-boxes D, with the links E and F, by which the side bars G are supported, in combination with the pedestals I, springs J, and supplemental bars H, substantially as and for the purpose herein described.

2. The axle-boxes D, with the spring or elastic arms N, curved so as to form an arc about the moving center of the bar K, said arms moving through the guides O, by which the parts are steadied and relieved from end thrust, substantially as herein described.

In witness whereof I hereunto set my hand.

GEORGE VINCENT.

Witnesses:
   GEO. H. STRONG,
   FRANK A. BROOKS.